Patented Nov. 10, 1942

2,301,312

UNITED STATES PATENT OFFICE 2,301,312

MANUFACTURE OF ARTIFICIAL FILAMENTS, FOILS, AND OTHER MATERIALS HAVING A BASIS OF ORGANIC DERIVATIVES OF CELLULOSE

Robert Wighton Moncrieff and Harold Bates, Spondon, near Derby, England, assignors to Celanese Corporation of America, a corporation of Delaware No Drawing. Application September 4, 1940, Serial No. 355,376. In Great Britain September 18, 1939

9 Claims. (Cl. 8—130)

This invention relates to improvements in the manufacture of artificial materials and particularly to the manufacture of artificial filaments, foils and other materials having a basis of organic derivatives of cellulose and having improved ironing and other properties.

It has been discovered that artificial materials having very valuable properties, e. g. a high safe-ironing temperature, a good tenacity and an affinity both for direct cotton dyestuffs and for water-insoluble dyestuffs, may be obtained by partially saponifying artificial filaments, foils and other materials having a basis of a mixed ester of cellulose containing a substantial proportion of the radicle of acetic acid or other monocarboxylic acid, particularly a lower fatty acid, e. g. 2 or 2½ radicles per $C_6H_{10}O_5$ nucleus, and a lower proportion of a polybasic acid radicle. The process is of particular value for improving the properties of materials having a basis of cellulose acetate or other monocarboxylic acid ester of cellulose, especially materials having a basis of ordinary acetone-soluble cellulose acetate, when it is effected by introducing into them the residue of the polybasic acid, particularly adipic acid or other polycarboxylic acid, and then partially saponifying the materials. In this manner products may be obtained which have a substantially higher ironing temperature than that of the materials before introduction of the polybasic acid radicle and have at the same time substantially the same or an even greater breaking strength. Products may be obtained having an ironing temperature better than that of regenerated cellulose materials or of real silk. Further, their fusion temperature may be increased very considerably, for example up to 320 or 340° C. or more, and they may even be rendered quite infusible. The properties of the products, particularly as regards breaking strength, are considerably better than those of products obtained by processes in which saponification is effected prior to the introduction of the polybasic acid radicles.

Products may be obtained which are insoluble in most, if not all, organic solvents, which facilitates dry cleaning, and which moreover are resistant to boiling soap solutions, whereas, as is well known, ordinary cellulose acetate materials are rapidly delustred by such media.

Preferably, the polybasic acid radicle is the radicle of adipic acid. The introduction of the radicle may be effected with the use of adipyl chloride but the method which it is preferred to employ is that described in U. S. application S. No. 344,460, filed July 8, 1940, in which a mixed anhydride of adipic and acetic acids is employed. Esterification with a mixed anhydride at a temperature above 100° C. and particularly from 140–160° C. is an especially suitable method of obtaining the alkali-insoluble polybasic acid esters with which the present application is concerned, in which all the acid radicles of the polybasic acid are attached to the cellulose nucleus.

The process will be described in relation to the introduction of the adipic acid radicle into cellulose acetate materials since this is of most importance. It is to be understood, however, that materials made of other monocarboxylic acid esters of cellulose may be treated, for example materials made of cellulose acetate-propionate or acetate-butyrate, cellulose propionate or cellulose butyrate, and that other polybasic acid radicles may be introduced. Radicles of phthalic and tartaric acids give very satisfactory results while radicles of other acids which may be introduced are those of citric, succinic and oxalic acids.

Filaments made of commercial cellulose acetate having an acetyl content of about 52–54% may be treated in the form of hanks of yarn in order to introduce the adipic acid radicle but in general it is preferable to treat them after the yarns containing them have been converted into woven, knitted or other fabrics. It is preferable to introduce a proportion of adipic acid radicle corresponding with an increase in weight of about 10–15% so as to obtain a product which is practically a tri-ester.

The esterification in itself, as indicated in the prior specification referred to above, yields a product having an increased ironing temperature and fusion point. However, on subjecting the product to saponification both the ironing temperature and fusion point may be still further increased, in conjunction with an increase in breaking strength.

Saponification may be effected with an organic base, e. g. methylamine, ethylamine or ethylene diamine, dissolved in water or other suitable diluent, as described e. g. in U. S. Patents Nos. 2,091,967 and 2,092,004, but preferably an inorganic base is employed, particularly a dilute solution of sodium or potassium hydroxide containing sodium acetate or other buffer salt at a temperature of 40 to 80° C. A concentration of from about 0.5% up to 3 or 5% is in general most satisfactory. The degree of saponification may be equal to a loss in weight of the adipylated materials of, e. g. 10 or 20% or more. Up to a loss of about 30% the greater the degree of saponification the more marked is the improvement in the properties of the products. However the rate of improvement falls off considerably after a loss in weight of about 10% has been produced. It will be appreciated, moreover, that the greater the degree of saponification the smaller is the weight of fabric or other material obtained and that from the commercial point of view it is desirable to reduce this loss in weight as much as possible. With this object in mind it has been found that in general products having satisfactory properties, e. g. an ironing temperature as good as or even better than that of cotton or viscose, may be produced with a loss in weight of only about 10%. At this stage materials made from commercial acetone-soluble cellulose acetate have about the same weight as before esterification and saponification.

The following example is given in order to illustrate the invention.

*Example*

A cellulose acetate fabric is thoroughly scoured and is then, after drying, adipylated for 3 to 4 hours at boiling point in a bath obtained by heating a mixture of 4 parts of adipic acid and 10 parts of acetic anhydride for about 15 to 30 minutes, distilling off free acetic acid formed and dissolving the product in about 980 parts of xylene. The volume ratio of bath to fabric is about 100–1. On completion of adipylation the fabric is washed with carbon tetrachloride, dried, boiled with water and then saponified with a solution containing 0.5% of caustic soda and 10% of sodium acetate at 50° C. for about 15 minutes until a loss in weight of approximately 10% has been produced. The fabric is then washed in water, boiled with 0.1% solution of oxalic acid for 30 minutes, washed in boiling water and dried. The fabric obtained has a considerably increased safe ironing temperature, a good tenacity, affinity for both direct cotton dyestuffs and water-insoluble dyestaffs, and insolubility in most organic solvents.

Similar results may be obtained by the treatment of ordinary cellulose acetate yarns in hank form and of cellulose acetate yarns of high tenacity obtained by stretching ordinary cellulose acetate yarns in wet steam or hot water at superatmospheric pressures. In the latter case also yarns may be produced having a higher dry extensibility than that of the original high tenacity yarns.

As has been already indicated, the process is applicable to the treatment of materials having a basis of organic derivatives of cellulose containing other monocarboxylic acid radicles, especially radicles of lower fatty acids such as propionic and butyric acids. In most cases the best results from the commercial point of view i. e. the production of products of good properties without too great a loss in weight, are obtained by saponifying materials containing substantially three ester radicles per $C_6H_{10}O_5$ nucleus until a loss in weight of about 10% has been effected.

Having described our invention, what we desire to secure by Letters Patent is:

1. Process for the treatment of artificial materials, which comprises partially saponifying filaments made of an organic ester of cellulose which contains a substantial proportion of the radicle of a monocarboxylic acid and a lower proportion of the radicle of an acid selected from the group consisting of adipic, succinic and phthalic acids, and which is insoluble in organic solvents.

2. Process for the treatment of artificial materials, which comprises partially saponifying filaments made of an organic ester of cellulose which contains a substantial proportion of the radicle of acetic acid and a lower proportion of the radicle of an acid selected from the group consisting of adipic, succinic and phthalic acids, and which is insoluble in organic solvents.

3. Process for the treatment of artificial materials, which comprises partially saponifying filaments made of an organic ester of cellulose which contains a substantial proportion of the radicle of a monocarboxylic acid and a lower proportion of the radicle of an acid selected from the group consisting of adipic, succinic and phthalic acids, and which is insoluble in organic solvents, the saponification being effected with a dilute aqueous solution of caustic alkali at a temperature between 40 and 80° C.

4. Process for the treatment of artificial materials, which comprises partially saponifying filaments made of an organic ester of cellulose which contains a substantial proportion of the radicle of acetic acid and a lower proportion of the radicle of an acid selected from the group consisting of adipic, succinic and phthalic acids, and which is insoluble in organic solvents, the saponification being effected with a dilute aqueous solution of caustic alkali at a temperature between 40 and 80° C.

5. Process for the treatment of artificial materials, which comprises partially saponifying filaments made of an organic ester of cellulose which contains a substantial proportion of the radicle of a monocarboxylic acid and a lower proportion of the radicle of an acid selected from the group consisting of adipic, succinic and phthalic acids, and which is insoluble in organic solvents, the saponification being effected only until the loss in weight of the mixed ester is about 10%.

6. Process for the treatment of artificial materials, which comprises partially saponifying filaments made of an organic ester of cellulose which contains a substantial proportion of the radicle of acetic acid and a lower proportion of the radicle of an acid selected from the group consisting of adipic, succinic and phthalic acids, and which is insoluble in organic solvents, the saponification being effected only until the loss in weight of the mixed ester is about 10%.

7. Process for the treatment of filaments, foils and similar materials made of an organic ester of cellulose which contain free hydroxy groups and a substantial proportion of a monocarboxylic acid, which comprises esterifying the materials with retention of their structure at a temperature of 140 to 160° C. with a mixed anhydride containing the radicle of a lower monocarboxylic acid and the radicle of an acid selected from the group consisting of adipic, succinic and phthalic acids, and then partially saponifying the materials.

8. Process for the treatment of filaments, foils and similar materials made of an organic ester of cellulose which contain free hydroxy groups and a substantial proportion of a monocarboxylic acid, which comprises esterifying the materials with retention of their structure at a temperature of 140 to 160° C. with a mixed anhydride containing the radicle of a lower monocarboxylic acid and the radicle of an acid selected from the group consisting of adipic, succinic and phthalic acids, and then partially saponifying the materials only until the loss in weight of the mixed ester of cellulose is about 10%.

9. Process for the treatment of filaments, foils and similar materials made of acetone-soluble cellulose acetate, which comprises esterifying the materials with retention of their structure at a temperature of 140 to 160° C. with a mixed anhydride containing the radicle of a lower monocarboxylic acid and the radicle of an acid selected from the group consisting of adipic, succinic and phthalic acids, and then partially saponifying the materials only until the loss in weight of the mixed ester of cellulose is about 10%.

ROBERT WIGHTON MONCRIEFF.
HAROLD BATES.